United States Patent [19]

Osaka et al.

[11] Patent Number: 5,820,905
[45] Date of Patent: Oct. 13, 1998

[54] ANTIFOAMING AGENT AND CANNED DRINK USING THE SAME

[75] Inventors: Mitsuaki Osaka; Naoya Otomo; Toru Tagawa, all of Kanagawa, Japan

[73] Assignee: Mitsubishi Chemical Company, Tokyo, Japan

[21] Appl. No.: 785,158

[22] Filed: Jan. 13, 1997

[30] Foreign Application Priority Data

Jan. 11, 1996 [JP] Japan ................................ 8-003160

[51] Int. Cl.$^6$ ............................ A23L 2/38; A23L 3/3463
[52] U.S. Cl. .................... 426/131; 426/329; 426/330; 426/330.3; 426/330.4; 426/330.5; 426/564; 426/569; 426/590; 426/477; 426/654; 220/906; 514/558; 514/943
[58] Field of Search .................... 426/131, 330.3, 426/397, 590, 654, 329, 330, 330.4, 330.5, 564, 569, 477; 532/1; 220/906; D09/516; 514/558, 943

[56] References Cited

U.S. PATENT DOCUMENTS

| | | | |
|---|---|---|---|
| 4,093,750 | 6/1978 | Babaya | 426/250 |
| 4,419,378 | 12/1983 | Rule | 426/592 |
| 5,378,484 | 1/1995 | Suwa et al. | 426/250 |

FOREIGN PATENT DOCUMENTS

| | | | |
|---|---|---|---|
| 6-14713 | 1/1994 | Japan | A23F 3/00 |
| 7-188696 | 7/1995 | Japan | C11D 1/825 |
| 8-038127 | 2/1996 | Japan | A23L 2/38 |

*Primary Examiner*—Michael P. Woodward
*Assistant Examiner*—M. K. Zeman
*Attorney, Agent, or Firm*—Sughrue, Mion, Zinn, Macpeak & Seas, PLLC

[57] ABSTRACT

An antifoaming agent which comprises, as the main component, one or more polyglycerol fatty acid esters having a specific degree of polymerization of polyglycerol, specific fatty acid types and a specific saponification value, as well as a canned drink containing the same. The antifoaming agent exhibits an excellent antifoaming effect and solve the problem of blow-off and splash of canned drinks.

3 Claims, No Drawings

ANTIFOAMING AGENT AND CANNED DRINK USING THE SAME

FIELD OF THE INVENTION

The present invention relates to an antifoaming agent and a drink using the same. More particularly, the present invention relates to an antifoaming agent comprising a specific polyglycerol fatty acid ester as an active component and to a canned drink containing the same.

BACKGROUND OF THE INVENTION

There have been marketed non-carbonated canned drinks (i.e., drinks other than carbonated ones) such as fruit juices (orange juice, apple juice, etc.), coffee drinks, tea drinks (black tea, oolong tea, etc.) and sport drinks. These canned drinks are kept cool or hot and sold from vending machines, etc. In general, these non-carbonated drinks are packed in three-piece iron cans (composed of a top, base and cylindrical sidewall open at both ends) for negative pressure filling. In these three-piece iron cans for negative pressure filling, a negative pressure of about 35 to 45 cmHg is applied to the head space so as to prevent the packed drink from oxidation. Because the can is liable to be dented (paneling) due to the external pressure, the sidewall of the three-piece can for negative pressure filling has a plate thickness of about 0.2 mm for preventing paneling.

In recent years, even in the field of non-carbonated drinks, the above-mentioned three-piece cans for negative pressure filling have been replaced by two-piece aluminum cans (composed of a cylindrical can and lid) for positive pressure filling. Such two-piece positive pressure cans, which have been employed in packing carbonated drinks containing supersaturated gas (soft drinks containing carbon dioxide, beer, etc.), never suffer from paneling. In particular, two-piece positive pressure cans made of aluminum can be designed with utilizing the metallic color of the ground. In addition, these cans are superior to the conventional three-piece negative pressure cans in various points, for example, excellent productivity, excellent corrosion resistance and flavor characteristics. Thus, attempts have been made to broaden the application range of these two-piece positive pressure cans.

The sidewall of the two-piece positive pressure cans has a very thin plate thickness of from about 0.08 to 0.15 mm. Accordingly, when a non-carbonated drink is simply filled therein, the can would be dented in the sidewall and thus cannot be used. Accordingly, there has been widely employed a procedure of dropping liquid nitrogen into the contents of the can so as to make the pressure within the can positive and to impart rigidity to the can, i.e., making the pressure within a can positive (gauge pressure: from about 0.05 to 2.5 kg/cm$^2$) to thereby elevate the mechanical strength of the can for use with a non-carbonated drink.

However, this procedure leads to the following problem. When such a can is shaken, for example, shaking by a consumer, due to taking out from a vending machine, or due to conveyance in a car, a considerable amount of bubbles are formed within the head space in the can. When the can is opened, therefore, these bubbles splash around the opening and soil clothes, etc., thus giving an unpleasant feeling to consumers. In particular, some non-carbonated drinks (coffee, orange juice, apple juice, etc.) would separate out upon storage. In such a case, it is sometimes indicated to shake the can well before drinking so as to facilitate the dispersion, and some consumers get into the habit of shaking cans before opening, which makes the aforementioned problem more serious. This trouble occurs in a considerably large number of drinks, for example, coffee, teas of all types (black tea, oolong tea, etc.), highly viscous drinks (soup, etc.) and tomato juice.

To solve this problem, it has been proposed to add, as an antifoaming agent, a surfactant usable as a food additive. However, foaming in drinks depends on the components contained in the drinks, the storage temperature, etc. Further, highly foamable materials (coffee, black tea, milk powder, etc.) are employed in some cases. That is, foaming should be controlled by complicated factors and each of the techniques proposed so far does not always succeed in the achievement of any satisfactory effects.

Thus, an object of the present invention is to provide an antifoaming agent for solving the problems of blow-off, splashing, etc., of canned drinks and a drink containing the same.

SUMMARY OF THE INVENTION

The present inventors have conducted extensive studies on the control of the foaming, particularly in canned drinks. As a result, they have successfully found that a specific polyglycerol fatty acid ester (hereinafter "polyglycerol fatty acid ester" is sometimes referred to simply as "PoGE") is effective as an antifoaming agent and shows a particularly remarkable antifoaming effect at cold temperatures of 0° to 20° C., thus completing the present invention. The gist of the present invention is to provide an antifoaming agent for drinks which comprises one or more polyglycerol fatty acid esters as the active component, wherein the PoGE or each of PoGEs has a specific degree of polymerization of polyglycerol (hereinafter "polyglycerol" is sometimes referred to simply as "PoG"), specific fatty acid types and a specific saponification value are used, as well as to provide a drink containing this antifoaming agent.

DETAILED DESCRIPTION OF THE INVENTION

Hereinafter, the present invention will be described in detail.

The polyglycerol fatty acid ester employed as the active component in the antifoaming agent of the present invention has a constituting polyglycerol having a degree of polymerization of 4 to 12 and is respectively selected from the group consisting of (a) to (c):

(a) polyglycerol fatty acid esters wherein at least 80% by weight of the constituting fatty acids are unsaturated fatty acids having 16 to 18 carbon atoms and the saponification value is from 70 to 100 or from 120 to 160;

(b) polyglycerol fatty acid esters wherein at least 80% by weight of the constituting fatty acids are saturated fatty acids having 8 to 14 carbon atoms and the saponification value is of from 120 to 200; and (c) polyglycerol fatty acid esters wherein at least 80% by weight of the constituting fatty acids are unsaturated fatty acids having 20 to 24 carbon atoms and the saponification value is from 130 to 150.

The average degree of polymerization of the PoG, i.e., the main skeleton of the PoGE to be used, ranges from 4 to 12. An average degree of polymerization exceeding 12 increases the viscosity, which sometimes affects the viscousness of the drink to which the antifoaming agent is added. An average degree of polymerization lower than 4 sometimes does not show sufficient antifoaming effects.

The average degree of polymerization as used herein means the number average degree of polymerization. The number average degree of polymerization of PoG may be obtained by the conventional method for analyzing terminal hydroxyl groups (cf. *Polyglycerol esters*, published in October, 1994 by Sakamoto Yakuhin Kogyo). That is, the hydroxyl value of the polyglycerol is measured with the acetic anhydride.pyridine method (in accordance with the U.S. Federal Chemical Codex method), and the number average degree of polymerization of PoG is calculated from the relation between the hydroxyl value, the number average degree of polymerization, and the number average molecular weight.

The saponification value of the PoGE which is the active component of the antifoaming agent and the fatty acids constituting the PoGE widely vary from PoGE (a) to PoGE (c). With respect to the PoGE (a), the saponification value ranges preferably from 70 to 100 or from 120 to 160. When the saponification value deviates from this range (for example, less than 70), the solubility of the PoGE in water is extremely elevated and thus no antifoaming effect can be expected. When the saponification value exceeds 100 but is less than 120 or when the saponification value exceeds 160, no antifoaming effect can be expected.

With respect to the PoGE (b), the saponification value ranges from 120 to 200, preferably from 130 to 150. When the saponification value deviates from this range (for example, less than 120), the solubility of the PoGE in water is extremely elevated and thus no antifoaming effect can be expected. When the saponification value exceeds 200, on the contrary, no effective antifoaming effect can be expected.

With respect to the PoGE (c), the saponification value ranges from 130 to 150, preferably from 130 to 140. When the saponification value deviates from this range (for example, less than 130), the solubility of the PoGE in water is extremely elevated and thus no antifoaming effect can be expected. When the saponification value exceeds 150, on the contrary, no effective antifoaming effect can be expected.

The term "saponification value" means the amount (mg) of potassium hydroxide (KOH) required to saponify 1 g of oil, fat, or the like. Saponification means the reaction that soap and glycerol are formed when oil, fat, or the like is boiled with potassium hydroxide (or with sodium hydroxide). With respect to PoGE, polyglycerol and fatty acid soap are formed from PoGE.

The saponification value may be measured by the following method. One to two grams of the sample are boiled under reflux with an ethanolic potassium hydroxide aqueous solution (80° to 90° C., about 30 minutes), which is then titrated with hydrochloric acid or the like. The saponification value is calculated from the amount of titration.

As the fatty acids constituting the PoGE to be used in the present invention, any fatty acids may be used so long as they satisfy the requirements in the carbon atom numbers as specified in the PoGEs (a) to (c) as described above. As the constituting fatty acids of PoGE (a), at least 80% by weight thereof are unsaturated fatty acids having 16 to 18 carbon atoms and illustrative examples thereof include oleic acid, linoleic acid, ricinoleic acid, and the like. As the constituting fatty acids of PoGE (b), at least 80% by weight thereof are saturated fatty acids having 8 to 14 carbon atoms and illustrative examples thereof include caprylic acid, capric acid, lauric acid, myristic acid, and the like. As the constituting fatty acids of PoGE (c), at least 80% by weight thereof are unsaturated fatty acids having 20 to 24 carbon atoms and illustrative examples thereof include erucic acid and the like.

The remaining parts of the constituting fatty acids of PoGE (a) to (c) are not particularly limited, which can be selected, for example, from the main constituting fatty acids exemplified above.

The PoG as a raw material for the PoGE can be produced according to any known methods therefor. In general, the process comprises adding an acidic or alkaline catalyst to glycerol in a small amount, and heating the reaction system at a temperature of not less than 180° C. under atmospheric or reduced pressure. After the reaction, the resultant PoG is subjected to neutralization or desalting treatment, if necessary. The PoG used in the present invention can have an optional average degree of polymerization without limitation. Generally, the average degree of polymerization of the PoG is 4 to 12. When the PoGE, which is an esterified product of the PoG, is used as additives for foods or the like, the average degree of polymerization of the PoG is preferably in the range of 4 to 12, more preferably 6 to 12.

The corresponding fatty acid, which is reacted with the PoG to obtain the PoGE in the PoGEs (a) to (c) as described above, may include free fatty acids or esters of such fatty acids with lower alcohols. Any kind of fatty acids can be used for the preparation of the PoGE. In general, linear or branched, saturated $C_8$–$C_{14}$ or unsaturated $C_{16}$–$C_{24}$ fatty acids or hydroxy-containing fatty acids are preferable. The fatty acids can be used singly or in the form of a mixture containing 2 or more of the fatty acids at optional mixing ratios. Examples of the preferable fatty acids include capric acid, caprylic acid, lauric acid, myristic acid, palmitic acid, stearic acid, and iso-stearic acid, 2-ethyl-hexanoic acid as saturated fatty acid, oleic acids; ricinoleic acid, and erucic acid as unsaturated fatty acids; and hydroxy-stearic acid as hydroxy-containing fatty acids; or lower alkyl esters of these fatty acids including methyl esters, ethyl esters or glycerol esters. These examples of the fatty acids can be used as a single fatty acid or mixture of two or more thereof.

The PoGE can be prepared by esterification with the PoG and the fatty acid or by an ester exchange reaction with the PoG and a fatty acid ester. The esterification or ester exchange reaction is generally carried out at an elevated temperature of not less than 130° C. in the presence of an alkaline catalyst. The reaction system may be either a reduced pressure system or atmospheric pressure system. If necessary, after the reaction, neutralization or desalting is carried out for the reaction product. Similarly, the esterification or ester exchange reaction can be carried out in the presence of enzymes such as lipase. As the PoGE usable in the present invention, there may be exemplified the obtained crude PoGE containing unreacted PoGE by-product or the like, and PoGE subjected to purification treatment such as steam distillation to remove colored or odor components. Further, mixed PoGE containing another PoGE prepared under different reaction conditions at an adequate mixing ratio may be exemplified.

When the PoGE (i.e., the active component of the antifoaming agent) is hardly soluble in water and thus can be scarcely dispersed in a drink, a dispersing agent may be separately added so as to give a homogeneous dispersion in an aqueous medium, which is then added to the drink. It is preferable to employ this method, since the dispersing agent can be easily added to a drink, etc., in the production process.

The dispersing agent having an HLB of at least 5 which is used in the present invention is not particularly limited as long as the hardly water-soluble PoGE can be dispersed, and examples thereof include polyglycerol fatty acid esters, sucrose fatty acid esters, propylene glycol fatty acid esters, sorbitan fatty acid esters, organic monoglycerides, polysorbates, lactic acid ester derivatives, and the like.

The HLB value may be measured in accordance with the experientially established conventional method. That is, a surface active agent having a known HLB is mixed with a surface active agent having an unknown value in various mixing ratios, and the HLB value can be determined based on a mixing ratio at which an oil having a known HLB is most emulsified. For example, soy bean oil (HLB=8.3) and the like may be used as the oil having a known HLB and SPAN 60 (HLB=4.7), TWEEN 60 (HLB=14.9), and the like may be used as the surface active agent having a known HLB.

In particular, it is preferable to use an antifoaming agent comprising the PoGE (a) and the PoGE (b), and it is further preferable to use an antifoaming agent comprising the PoGE (a) and the PoGE (b) at a weight ratio (a):(b) of from 1:5 to 5:1, since an excellent antifoaming effect can be achieved.

In this case, the PoGE content in the dispersion ranges from 1 to 50% by weight, preferably from 5 to 30% by weight, based on the dispersion. The dispersing agent to be used for the dispersion preferably has an HLB of at least 5. The content of the dispersing agent ranges preferably from 0.01 to 50% by weight, more preferably from 1.0 to 40% by weight, based on the PoGE.

When the PoGE content in the dispersion is less than 1% by weight, the low content of the active component in the antifoaming agent causes disadvantages in transportation, etc. When the content exceeds 50% by weight, on the other hand, the viscosity of the dispersion is elevated, which sometimes makes it difficult to prepare a homogeneous dispersion.

When the HLB of the dispersing agent is less than 5, the resulting dispersion has an insufficient stability and the antifoaming effect is sometimes deteriorated. When the content of the dispersing agent is less than 0.01% by weight based on the PoGE, sufficient effects are obtained in some cases. On the other hand, it is economically disadvantageous to add the dispersing agent in an amount exceeding 50% by weight, since a further increase in the effect is not expected.

As the aqueous medium, water is usually employed. However, water containing an alcohol such as ethanol can also be used.

Examples of the drinks containing the antifoaming agent of the present invention include canned coffee drinks (sugar-containing coffee, non-sugar coffee, milk coffee, etc.), canned black teas (straight tea, milk tea, etc.), milk drinks, soft drinks containing milk, fermented milk drinks (pasteurized, unpasteurized), dairy drinks, soft drinks containing fruit juice, etc., and tea drinks (oolong tea, etc.).

The content of PoGE in a drink is preferably from 0.003 to 0.1% by weight. When the PoGE content is less than 0.003% by weight, a sufficient antifoaming effect is not obtained. It is economically disadvantageous that the PoGE content exceed 0.1%, since a further increase in the effect is not expected.

The antifoaming agent of the present invention exhibits a particularly remarkable antifoaming effect at low temperatures of from 0° to 20° C. It is particularly suitable for drinks which are served at 0° to 10° C. The antifoaming agent of the present invention exerts a remarkable effect of suppressing the blow-off and splashing upon opening of drinks packed in positive pressure cans which are to be stored, supplied and sold at such low temperatures. In addition to the effect of suppressing the blow-off and splashing upon opening, the antifoaming agent of the present invention can suppress foaming in the step of filling drinks into cans in the production process, thus contributing to the elevation of the production efficiency and yield.

The drink containing the antifoaming agent of the present invention may further contain other antifoaming agents (for example, an antifoaming agent showing a remarkable antifoaming effect at high temperatures of 40° C. or above), antimicrobial agents, dispersing agents, etc., so long as the effects of the present-invention are not deteriorated.

The drinks may be produced based on conventional methods. For example, a main raw material such as coffee extracts, milk components, fruit juices, or the like, a taste-controlling agent such as saccharides, sweeteners, citric acid as an acidity ingredient, flavor, or the like, an additive such as antifoaming agents, dispersing agents, antimicrobial agents, or the like, and water, etc. are mixed at once or by with dividing them into two or more portions; the components are dissolved or dispersed in the mixture; followed by heat-sterilization to obtained a drink.

The can used for the present invention is not particularly limited. In general, three-piece or two-piece cans made of a metal material such as iron, aluminum, or the like may be used. The inner pressure of the can may be negative, normal, or positive. With respect to the negative-pressure cans, the sidewall preferably has a plate thickness of about 0.2 mm for preventing paneling. With respect to the positive pressure cans, for example, aluminum cans having a thinner plate thickness than that of negative pressure cans (about 0.08 to 0.15 mm) are used and the pressure within a can is made positive (gauge pressure: from about 0.05 to 2.5 $kg/cm^2$) to thereby elevate the mechanical strength of the can.

The present invention is further illustrated by way of Examples, but it should be understood that the present invention is not construed as being limited thereto.

EXAMPLES 1 TO 3 AND 5 AND COMPARATIVE EXAMPLES 1 AND 2

A dispersing agent was dissolved in water. The resulting aqueous solution was heated to 70° C. and PoGE was added under stirring in such an amount as to give the concentration as specified in Table 1. Further, the mixture was emulsified and dispersed with a TK homogenizer (manufactured by Tokushu Kika Kogyo K.K.) at 5,000 to 12,000 r.p.m. for 5 minutes. After the completion of the emulsification and dispersion, the dispersion was cooled and ethanol was added thereto to prevent putrefaction. Thus, an antifoaming agent dispersion was obtained. This antifoaming agent dispersion was added to the milk coffee raw materials as specified below in such an amount as to give a PoGE content in the milk coffee of 0.015% by weight (150 ppm).

| Composition of milk coffee | % by weight |
| --- | --- |
| Coffee extract | 3.2 |
| Skim milk powder | 3.2 |
| Whole fat milk powder | 0.8 |
| Granulated sugar | 6.5 |
| Sucrose palmitic acid ester (P-1570; manufactured by Mitsubishi Kagaku Foods) | 0.03 |
| Sodium bicarbonate | 0.06 |
| Water | balance |

After adding the antifoaming agent dispersion to the milk coffee raw materials, the mixture was homogenized by using a high pressure homogenizer and sterilized in an autoclave at 121° C. for 20 minutes to give a milk coffee drink.

A 50 ml portion of the resulting milk coffee drink was put into a 200 ml graduated cylinder. Next, a foaming test was carried out by blowing air from a glass filter at a rate of 0.1

L/min and measuring the foam volume (i.e., the foam volume in the stationary phase) to evaluate the antifoaming effect. The measurement was carried out at 5° C. or 20° C.

EXAMPLE 4 AND COMPARATIVE EXAMPLES 3 AND 4

The procedure of Example 1 was repeated except that the PoGE was not added to the aqueous solution of the dispersing agent but added directly in the step of preparing the milk coffee drink. Thus, milk coffee drinks were prepared by using the PoGEs as listed in Table 1 and the antifoaming effects were evaluated.

COMPARATIVE EXAMPLE 5

The procedure of Example 1 was repeated except that no antifoaming agent and no dispersing agent were used. Thus, a milk coffee drink was prepared and the antifoaming effect was evaluated.

This application is based on Japanese patent application 8-3160, filed on Jan. 11, 1996, incorporated herein by reference.

What is claimed is:

1. A canned drink containing from 0.003 to 0.1% by wt. of an antifoaming agent, wherein said antifoaming agent comprises a mixture of:

(a) polyglycerol fatty acid esters wherein the constituting polyglycerol has a degree of polymerization of 4 to 12 and wherein at least 80% by weight of the constituting fatty acids are unsaturated fatty acids having 16 to 18 carbon atoms and wherein the saponification value of the polyglycerol fatty acid esters is from 120 to 160; and (b) polyglycerol fatty acid esters wherein the constituting polyglycerol has a degree of polymerization of from 4

TABLE 1

| | Polyglycerol fatty acid ester (PoGE)*1 | | | | Antifoaming agent dispersion | | | Foaming test | |
|---|---|---|---|---|---|---|---|---|---|
| | polyglycerol | fatty acid | saponification value | fatty acid concentration | PoGE content | Type of dispersing agent | dispersing agent content*2 | test temperature | foam volume |
| Example 1 | decaglycerol | oleic acid | 140 | 90%*3 | 20% | S-570*4 | 6.0% | 5° C. | 6 ml |
| 2 | decaglycerol | lauric acid | 130 | 95% | 20% | S-570 | 18% | 6° C. | 9 ml |
| 3 | decaglycerol | erucic acid | 135 | 90% | 10% | decaglycerol monolaurate | 36% | 20° C. | 10 ml |
| 4 | hexaglycerol | oleic acid | 90 | 90% | Direct addtion of PoGE alone | | | 5° C. | 12 ml |
| 5 | decaglycerol | oleic acid | 140 | 90% | 5% | P-1170*4 | 6.0% | 5° C. | 4 ml |
| | decaglycerol | lauric acid | 130 | 95% | 15% | | | | |
| Comparative Example 1 | decaglycerol | oleic acid | 165 | 90% | 40% | S-570 | 1.5% | 5° C. | 47 ml |
| 2 | decaglycerol | oleic acid | 110 | 90% | 20% | S-570 | 3.0% | 5° C. | 52 ml |
| 3 | decaglycerol | lauric acid | 220 | 95% | Direct addition of PoGE alone | | | 5° C. | 50 ml |
| 4 | decaglycerol | erucic acid | 100 | 90% | Direct addition of PoGE alone | | | 5° C. | 51 ml |
| 5 | — | — | — | — | no PoGE and no dispersing agent | | | 5° C. | 55 ml |

Note:
*1: PoGE content in milk coffee: 0.015% by weight.
*2: dispersing agent content is % by weight based on PoGE.
*3: every % given in Table 1 is by weight.
*4: S-570 and P-1170: sucrose fatty acid esters manufactured by Mitsubishi Kagaku Foods.

The present invention provides an excellent antifoaming agent for drinks and a drink containing the same, and thus enables the production of drinks which are free from blow-off even packed in positive pressure cans. Further, the antifoaming agent of the present invention can suppress foaming in the step of filling drinks into cans in the production process, thus largely contributing to the elevation of the production efficiency and yield.

While the invention has been described in detail and with reference to specific embodiments thereof, it will be apparent to one skilled in the art that various changes and modifications can be made therein without departing from the spirit and scope thereof.

to 12 and wherein at least 80% by weight of the constituting fatty acids are saturated fatty acids having 8 to 14 carbon atoms, and wherein the saponification value of the polyglycerol fatty acid esters is from 120 to 200;

and wherein the weight ratio of the polyglycerol fatty acid esters (a) to the polyglycerol fatty acid esters (b) is from 1:5 to 5:1.

2. The canned drink as claimed in claim 1, wherein said drink further comprises a dispersing agent having a hydrophile-lipophile balance of at least 5 in amount of from 0.01 to 20% by weight based on said anti-foaming agent.

3. The canned drink as claimed in claim 1, which is a drink packed in a positive pressure can.

* * * * *